United States Patent [19]

Mazaki et al.

[11] Patent Number: 5,491,001
[45] Date of Patent: Feb. 13, 1996

[54] METHOD FOR PRODUCING VIEWING ANGLE COMPENSATOR FOR LIQUID CRYSTAL DISPLAY

[75] Inventors: Hitoshi Mazaki, Kawasaki; Takehiro Toyooka; Hiroyuki Itoh, both of Yokohama, all of Japan

[73] Assignee: Nippon Oil Company, Limited, Tokyo, Japan

[21] Appl. No.: 208,445

[22] Filed: Mar. 9, 1994

Related U.S. Application Data

[63] Continuation-in-part of Ser. No. 939,166, Sep. 2, 1992, abandoned.

[30]    Foreign Application Priority Data

Sep. 3, 1991   [JP]   Japan ................................. 3-248482

[51] Int. Cl.⁶ ....................................................... B05D 5/06
[52] U.S. Cl. ................................................ 427/162; 359/73
[58] Field of Search ................................. 359/73; 427/162

[56]   References Cited

U.S. PATENT DOCUMENTS

| | | | |
|---|---|---|---|
| 4,293,435 | 10/1981 | Portugall et al. | 252/299.01 |
| 4,385,806 | 5/1983 | Fergason | 350/347 |
| 4,443,065 | 4/1984 | Funada et al. | 350/335 |
| 4,693,562 | 9/1987 | Hasegawa et al. | 350/337 |
| 4,702,558 | 10/1987 | Coles et al. | 350/330 |
| 4,995,705 | 2/1991 | Yoshinaga et al. | 350/350 |
| 5,150,235 | 9/1992 | Haim et al. | 359/68 |
| 5,243,451 | 9/1993 | Kanemoto et al. | 359/73 |
| 5,260,109 | 11/1993 | Iida et al. | 359/73 |
| 5,326,496 | 7/1994 | Iida et al. | 359/73 |

FOREIGN PATENT DOCUMENTS

| | | |
|---|---|---|
| 0380338 | 8/1990 | European Pat. Off. |
| 2047629 | 2/1990 | Japan . |
| 2067518 | 3/1990 | Japan . |
| 1462978 | 1/1977 | United Kingdom . |

*Primary Examiner*—Shrive Beck
*Assistant Examiner*—Erma Cameron
*Attorney, Agent, or Firm*—Scully, Scott, Murphy & Presser

[57]   ABSTRACT

The present invention relates to a method for producing a viewing angle compensator for liquid crystal displays which diminishes the view angle dependency of the liquid crystal display. More specifically, the method of making the view angle compensator involves applying a coating of an optically active polyester containing as a constituent a hydrocarbon unit selected from the group consisting of bulky aromatic units, polycyclic hydrocarbon units and ortho-substituted aromatic units, or a composition containing a liquid crystalline polyester which contains the said hydrocarbon unit as a constituent and also contains an optically active compound to a light transmitting substrate. The foregoing coating is heat-treated at a temperature higher than the glass transition point of the polyester to form a cholesteric orientation. The heat-treated coating is thereafter cooled to a temperature lower than the glass transition temperature to solidify a cholesteric structure.

6 Claims, 4 Drawing Sheets

1

METHOD FOR PRODUCING VIEWING ANGLE COMPENSATOR FOR LIQUID CRYSTAL DISPLAY

RELATED U.S. APPLICATIONS

This application is a continuation-in-part of U.S. Ser. No. 939,166, filed on Sep. 2, 1992, now abandoned.

BACKGROUND OF THE INVENTION

The present invention relates to a method for producing a viewing angle compensator for a liquid crystal display which can diminish the viewing angle dependency of the liquid crystal display.

Liquid crystal display is occupying an important position in the display field, taking the place of the cathode-ray tube, because of such characteristic features as being driven at a low voltage, light weight and low cost. However, since the liquid crystal display is based on a method of displaying images by utilizing orienting behaviors of a liquid crystalline substance having an optical anisotropy, it inevitably involves the problem (hereinafter referred to as "viewing angle dependency") that the color tone of screen changes according to directions of seeing the panel. For example, in the case of a lap-top type personal computer or a word processor display, utilizing a twisted nematic mode ("TN" hereinafter) or a super-twisted nematic mode ("STN" hereinafter), relatively good images are obtained when the screen is seen from the front, but when the screen is seen from a direction other than the front, the screen is colored or it becomes difficult to see images on the screen. Such viewing angle dependency of the display is not only undesirable to users but also is an obstacle to the realization of a larger screen which is required for a wall-mounted TV or the like. In the case of a large screen display, as long as the prior art is used, it is impossible to obtain clear images throughout the entire screen because the marginal portion comes to have a certain viewing angle even when the screen is seen from the front.

In connection with liquid crystal display, various display methods have been proposed. Particularly, it has been reported that a birefringence material having a negative optical anisotropy in the thickness direction exhibits a viewing angle compensating effect with respect to a display of the type wherein the state with liquid crystal molecules being oriented perpendicularly to a substrate is assumed to be a dark display. For example, it is disclosed in Japanese Patent Laid Open Nos. JP2-15237A, 2-15238A and 2-15239A that a birefringence layer having a negative optical anisotropy, obtained by a single or two sheets of oriented film, exhibits a viewing angle compensating effect for a TN display of a normally white mode or for an Electrically Controlled Birefringence (ECB) type display based on a Deformation of Aligned Phase (DAP) method. However, in the case where the compensation is to be effected with a single sheet of oriented film, the film must be completely uniaxial, but the production of such an oriented film is generally difficult, and in the case where two sheets of biaxial film are put one on the other, it is necessary that both films should be completely the same in three-dimensional refractive index and film thickness; besides, preciseness is required for the axial angle of each film. Thus, problems exist in point of manufacture and arrangement. Also, there has been proposed a method (Japanese Patent Laid Open No. JP3-67219A) wherein a film with a cholesteric structure solidified is produced using a liquid crystalline polymer such as, for example, a copolymer of benzyl-L-glutamate and dodecyl-L-glutamate and it is used as a viewing angle compensator. The use of such a liquid crystalline polymer involves problems; for example, the orienting process requires much time and labor and it is difficult to control the film thickness which is absolutely necessary for attaining a satisfactory viewing angle compensating effect.

The present inventors have already invented an optical element constituted by a nematic liquid crystalline polymer film having a twisted structure as a color compensator for TN (Japanese Patent Application No. 165718/1990) and STN (Japanese Patent Laid Open No. JP3-87720A). One important reason for the attainment of the said invention is that a liquid crystalline polymer containing ortho-substituted aromatic units, or a composition thereof, used in the invention can easily take a twisted nematic structure of monodomain. Again taking note of the good orienting property of a liquid crystalline polymer containing an ortho-substituted aromatic unit and the easiness of carrying out the orienting process, the present inventors considered it possible to produce a film having an intra-plane refractive index substantially averaged and larger than a refractive index in the thickness direction, that is, a film having a structure capable of being regarded substantially as a negative uniaxial structure has a sharper (shorter pitch) twisted structure than that required for a color compensator could be solidified. And as a result of earnest studies made on the basis of this thinking, we finally accomplished the present invention.

More specifically, in connection with the production of a compensator for a liquid crystal display, it is the object of the present invention to provide a method for producing a viewing angle compensator for a liquid crystal display using a liquid crystalline polymer film having a refractive index distribution wherein intra-plane refractive indices are approximately the same and larger than a refractive index in the thickness direction.

SUMMARY OF THE INVENTION

The present invention resides in a method for producing a viewing angle compensator for a liquid crystal display characterized in that an optically active polyester containing as a constituent a hydrocarbon unit selected from the group consisting of a hydrocarbon unit selected from the group consisting of aromatic units having a substituent selected from the group consisting of a hydrocarbon group of 3 to 8 carbon atoms, a halogen and mixtures thereof, polycyclic hydrocarbon units, and ortho substituent aromatic units or a composition containing a liquid crystalline polyester which contains the foregoing hydrocarbon unit as a constituent and an optically active compound, is heat treated at a temperature higher than the glass transition point of the polyester on an alignment film formed on a light transmitting substrate and then cooled to a temperature lower than the glass transition point of the polyester to solidify the cholesteric structure.

Figure 1E:
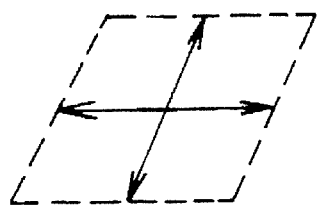
FIGS. 1(a)–1(e) are views showing the construction of the TN display and the viewing angle compensator both used in Example 2 of the present invention, also showing the direction of each axis.
Figure 1D:
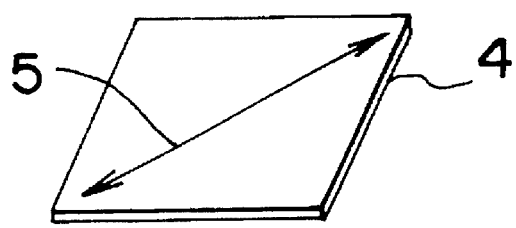
Figure 1C:
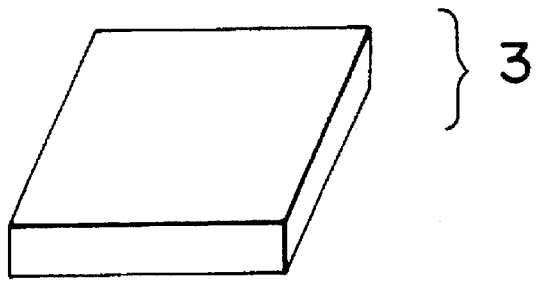
Figure 1B:
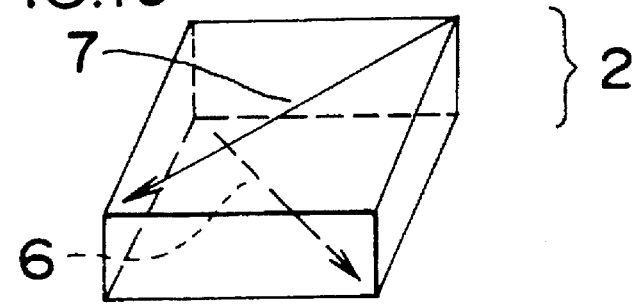
Figure 1A:
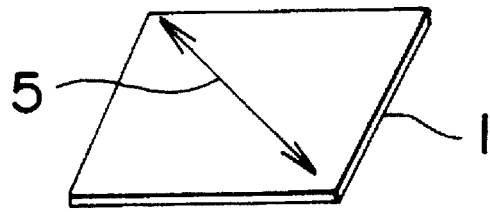

1. lower polarizing plate
2. liquid crystal cell
3. viewing angle compensator
4. upper polarizing plate
5. polarization axis direction
6. rubbing direction of a lower substrate of liquid crystal cell
7. rubbing direction of an upper substrate of liquid crystal cell

DESCRIPTION OF THE PREFERRED EMBODIMENTS

The compensator produced according to the present invention is required to have a three-dimensional refractive index distribution wherein refractive indices in a plane parallel to a substrate are approximately averaged and this average refractive index is larger than a refractive index in the thickness direction. For the intra-plane refractive indices to be almost averaged, it is necessary that a twisted structure be developed in the liquid crystal film. Moreover, in order for the intra-plane refractive indices to be averaged to a satisfactory extent, it is required to provide a twisted nematic structure of a shorter pitch than that of the twisted nematic structure of the color compensator which the present inventors have previously invented (Japanese Patent Laid Open No. JP3-87720A, Application No. 165718/1990). Further, it is desirable that the compensator of the present invention be transparent to light in the visible region and that a selective reflected light derived from a cholesteric structure be in an ultraviolet region or an infrared region difficult to be perceived by the human eye. The condition that the refractive index in the thickness direction should be smaller than the intra-plane refractive index can be easily attained by generally parallel orientation of a liquid crystalline polymer.

According to the method of the present invention for producing a viewing angle compensator, a composition comprising a specific liquid crystalline polyester which exhibits a uniform nematic orientation of monodomain and which permits easy solidifying of such oriented state, and a predetermined amount of an optically active compound incorporated in the said liquid crystalline polyester, or a liquid crystalline polyester which exhibits a uniform cholesteric orientation of monodomain and which permits easy solidifying of such oriented state, is applied onto an alignment film formed on a light transmitting substrate, then dried and heat-treated to form a uniform cholesteric structure of monodomain, followed by cooling treatment to solidify the cholesteric structure without damaging the orientation in the state of liquid crystal.

The following description is now provided first about the method for producing a viewing angle compensator using the former mentioned above, i.e., a composition comprising such specific liquid crystalline polyester and an optically active compound.

As to the liquid crystalline polymer which exhibits a uniform nematic orientation of monodomain and which permits easy solidifying of such oriented state, it is absolutely necessary for it to have the following property. For attaining a stable solidification of the nematic orientation, when viewed in terms of a phase series of liquid crystal, it is important that there be no crystal phase in a lower temperature region than the nematic phase. If a crystal phase is present, an inevitable passage through it at the time of cooling for solidification results in destruction of the nematic orientation once obtained, thus leading to unsatisfactory results in both transparency and compensating effect. In the compensator manufacturing method of the present invention, therefore, it is absolutely necessary to use a liquid crystalline polymer having glass phase in a lower temperature region than the nematic phase. By incorporating an optically active compound in the said polymer, the resulting composition exhibits a cholesteric orientation in the state of liquid crystal and assumes glass phase at a temperature lower than the liquid crystal transition point of the polymer, whereby the cholesteric structure can be solidified easily. As the liquid crystalline polymer to be used, a polyester is suitable because it exhibits a nematic orientation in the state of liquid crystal, assumes a glassy state at a temperature lower than the liquid crystal transition point thereof and can be produced easily. Particularly suitable is a liquid crystalline polyester containing as a constituent a hydrocarbon unit selected from the group consisting of (a) aromatic units having as a substituent at least one group selected from a hydrocarbon group of 3 to 8 carbon atoms and/or a halogen atom, (b) polycyclic hydrocarbon units, and (c) ortho-substituted aromatic units. In the case of a liquid crystalline polyester not containing such a specific hydrocarbon unit as a constituent, a crystal phase may appear without vitrifying at the time of cooling for solidification, thus resulting in destruction of the liquid crystal structure or the loss of transparency.

The "ortho-substituted aromatic unit" as referred to herein means a structural unit with main chain-constituting bonds ortho to each other. Examples are the following catechol, salicylic acid and phthalic acid units as well as substituted derivatives thereof:

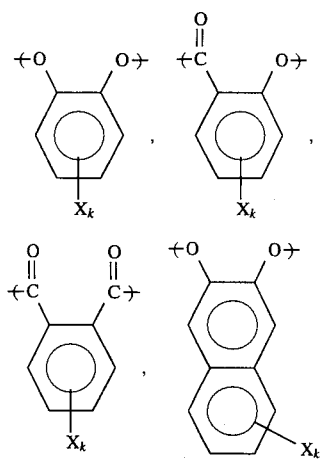

wherein X represents hydrogen, halogen, e.g. Cl or Br, an alkyl or alkoxy group having 1 to 4 carbon atoms, or phenyl, and k is 0 to 2.

The following are particularly preferred:

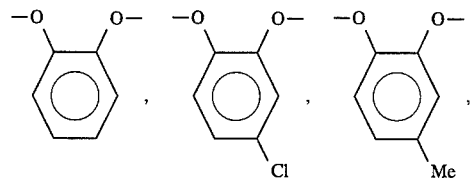

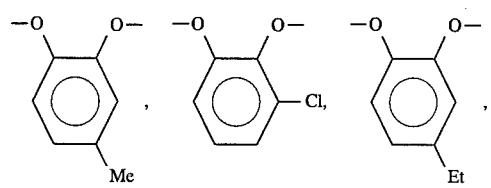

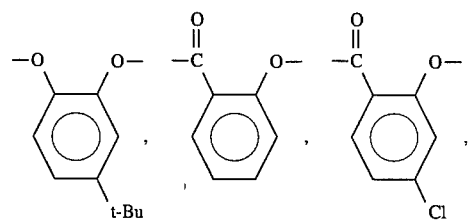

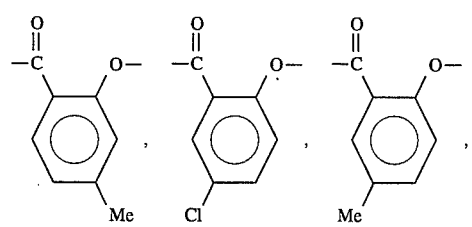

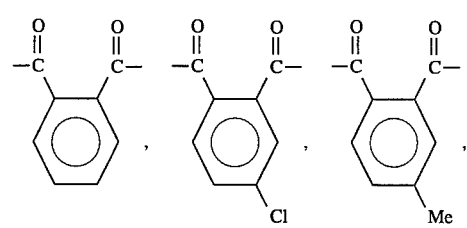

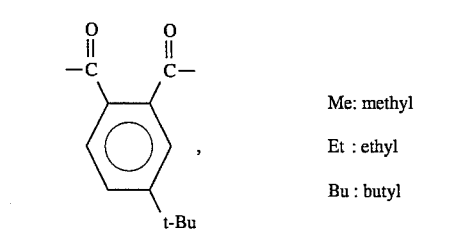

Me: methyl
Et : ethyl
Bu : butyl

As examples of the polyester used in the present invention there are mentioned those containing as repeating units (a) a structural unit (hereinafter referred to as "diol component") derived from a diol and a structual unit ("dicarboxylic acid component" hereinafter) derived from a dicarboxylic acid and/or (b) a structual unit ("hydroxycarboxylic acid component" hereinafter) derived from a hydroxycarboxylic acid containing both carboxyl and hydroxyl groups in one unit. Preferably, these polyesters further contain the foregoing ortho-substituted aromatic unit.

As examples of the diol component there are mentioned the following aromatic and aliphatic diols:

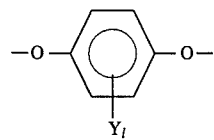

wherein Y represents hydrogen, halogen, e.g. Cl or Br, an alkyl or alkoxy group having 1 to 4 carbon atoms, or phenyl, and l is 0 to 2,

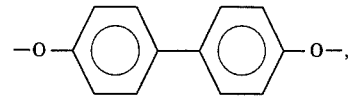

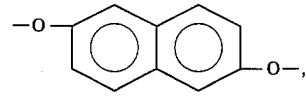

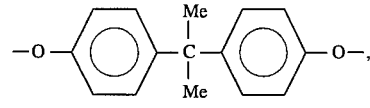

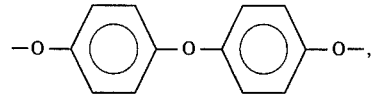

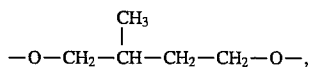

$-O+CH_2\!\!\frac{}{}\!\!_n\!O-$ (n is an integer of 2 to 12), $-O-CH_2-\overset{\underset{\displaystyle CH_3}{|}}{CH}-CH_2-CH_2-O-,$ $-O-CH_2-CH_2-\overset{\underset{\displaystyle CH_3}{|}}{CH}-CH_2-CH_2-CH_2O-,$

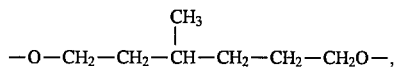

Particularly, the following are preferred:

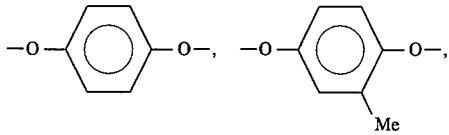

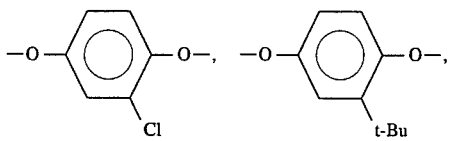

$-O-CH_2-CH_2-O-,\quad -O+CH_2\!\!\frac{}{}\!\!_n\!O-,$ $-O-CH_2-\overset{\underset{\displaystyle CH_3}{|}}{CH}-CH_2-CH_2-O-,$ $-O(CH_2)_6O-.$ As examples of the dicarboxylic acid component, the following may be mentioned:

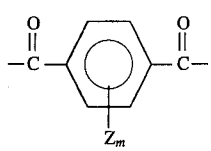

wherein Z represents hydrogen, halogen, e.g. Cl or Br, an alkyl or alkoxy group having 1 to 4 carbon atoms, or phenyl, and m is 0 to 2.

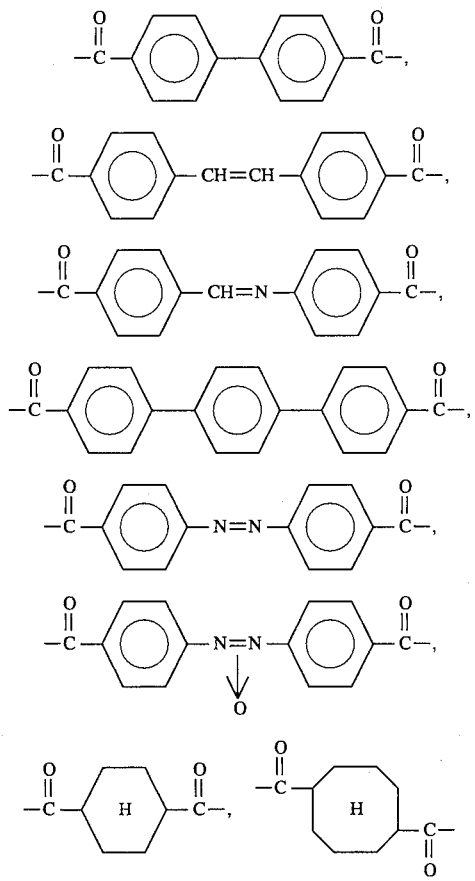

Particularly, the following are preferred:

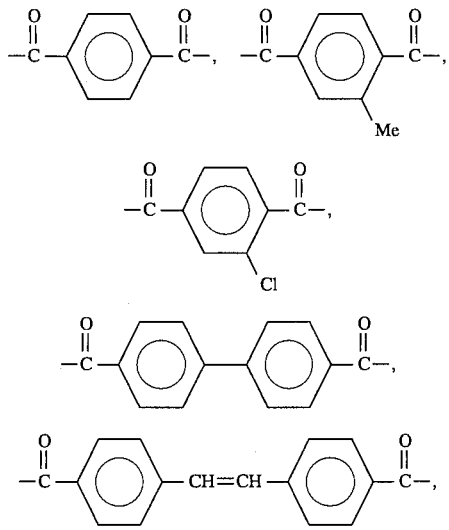

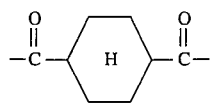

As examples of the hydroxycarboxylic acid component, the following units may be mentioned:

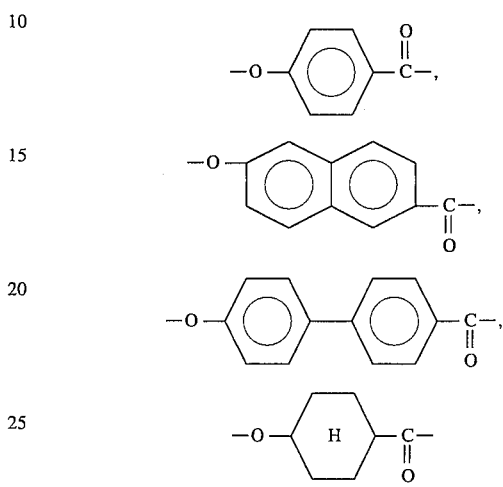

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole %, more preferably 10 to 30 mole %. In the case where the said proportion is smaller than 5 mole %, a crystal phase tends to appear under the nematic phase, so such proportion is not desirable. A proportion larger than 40 mole % is not desirable, either, because the polymer will no longer exhibit liquid crystallinity. The following are typical examples of polyesters which may be used in the present invention:

Polymer consisting essentially of the following structural units:

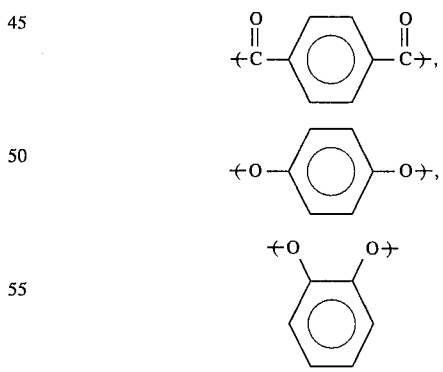

Polymer consisting essentially of the following structural units:

-continued

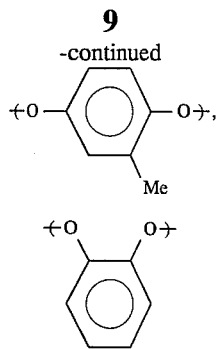

Polymer consisting essentially of the following structural units:

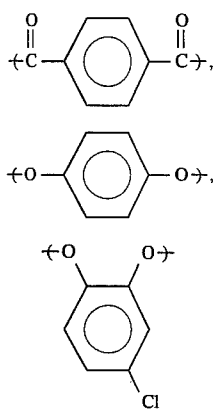

Polymer consisting essentially of the following structural units:

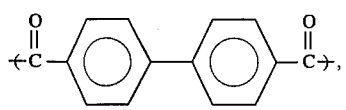

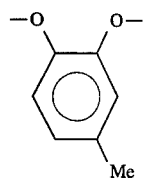

Polymer consisting essentially of the following structural units:

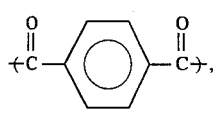

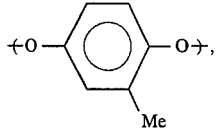

-continued $+OCH_2CHCH_2CH_2O+$,
     |
    $CH_3$

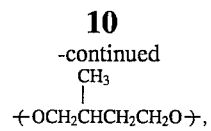

Polymer consisting essentially of the following structural units:

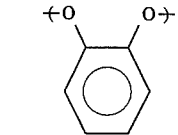

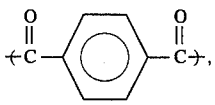

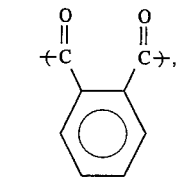

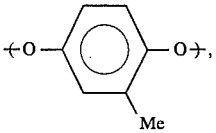

Polymer consisting essentially of the following structural units:

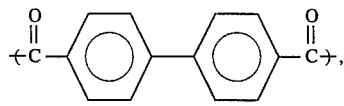

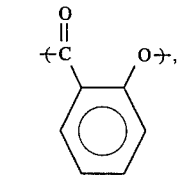

Polymer consisting essentially of the following structural units:

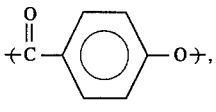

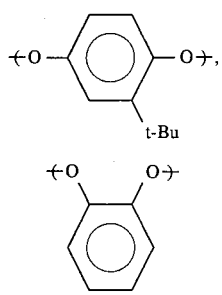

In the present invention, polyesters having bulky aromatic or polycyclic hydrocarbon-containing units as mentioned below, instead of the ortho-substituted aromatic unit, may be used since they exhibit good glassy state when they are cooled to solidify after an orientation treatment. Such bulky aromatic units are those containing a hydrocarbon group of 3 to 8, preferably 3–6 carbon atoms and/or halogen as a substituent or substituent. Examples are benzene, biphenyl or other aromatic hydrocarbon containing, as a substituent, a hydrocarbon group such as alkyl, e.g. n-propyl, isopropyl, n-butyl, isobutyl, sec-butyl, tert-butyl, n-pentyl, isopentyl, n-hexyl or isohexyl, aryl group, e.g. phenyl or tolyl, and aralkyl group, e.g. benzyl, or fluoro, chloro or such halogen-containing substituent. Of course a part or the whole of such hydrocarbon group may be substituted by halogen atom(s). Examples of polycyclic hydrocarbon units are fused polycyclic aromatic units having 7 to 12, preferably 7 to 10 carbon atoms, such as naphthalene and fused polycyclic hydrocarbon units containing a norbornane as a basic structure. Concrete examples of the polyester-constituting unit containing such bulky aromatic or polycyclic hydrocarbon, i.e. the aromatic unit and polycyclic hydrocarbon unit as referred in the present invention are shown below:

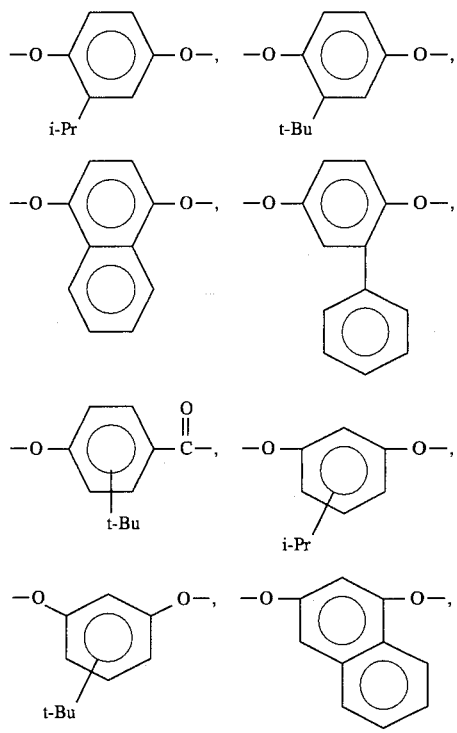

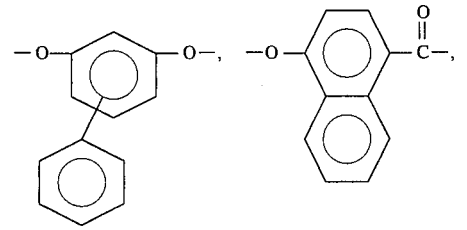

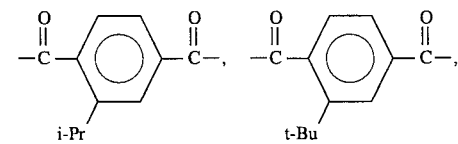

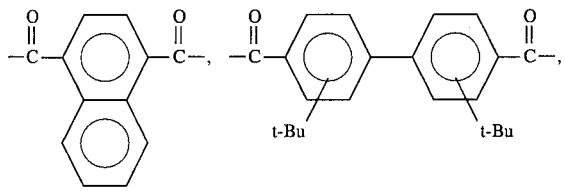

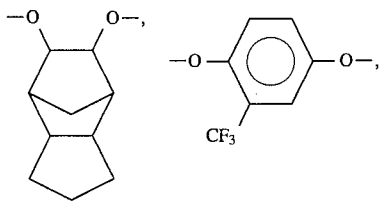

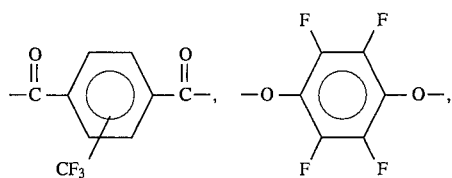

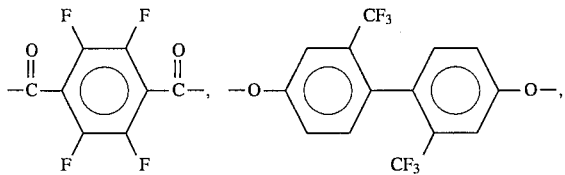

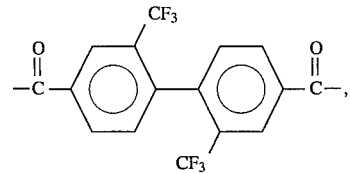

Polymers containing both of the bulky aromatic or polycyclic aromatic unit and the ortho-substituted aromatic unit may also be preferably used in the preparation of the compensator of the present invention.

The polymers exemplified above range in molecular weight preferably from 0.05 to 3.0, more preferably 0.07 to 2.0, in terms of inherent viscosity as determined at 30° C. in a solvent, e.g. a mixed phenol/tetrachloroethane [60/40 (weight ratio)] solvent. An inherent viscosity lower than 0.05 is not desirable because the strength of the resulting film of high molecular liquid crystal will be low, while if the inherent viscosity is higher than 3.0, there will arise such problems as the deterioration of orientatability and an increase of the time required for orientation because of too high viscosity during the formation of liquid crystal. The glass transition temperature is usually not lower than 0° C., preferably not lower than 10° C. Assuming that the working temperature is room temperature or thereabouts, though it also depends on the use, it is desirable that the glass transition points of the polyesters be not lower than 30° C., more preferably not lower than 50° C. In the case of a glass transition point lower than 30° C., the use of the compensator at room temperature or thereabouts may cause a change of the liquid crystal structure once immobilized, thus resulting in the deterioration of a function based on the liquid crystal structure. Therefore, such low glass transition point is not desirable.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid acceptor such as pyridine.

An explanation will now be made about an optically active compound which is incorporated in the nematic liquid crystalline polymers exemplified above for inducing a spiral structure. Typical examples are optically active low-molecular compounds. Any compound having optical activity can be used in the present invention, but from the standpoint of miscibility with the base polymer it is desirable to use optically active, liquid crystalline compounds. The following are concrete examples:

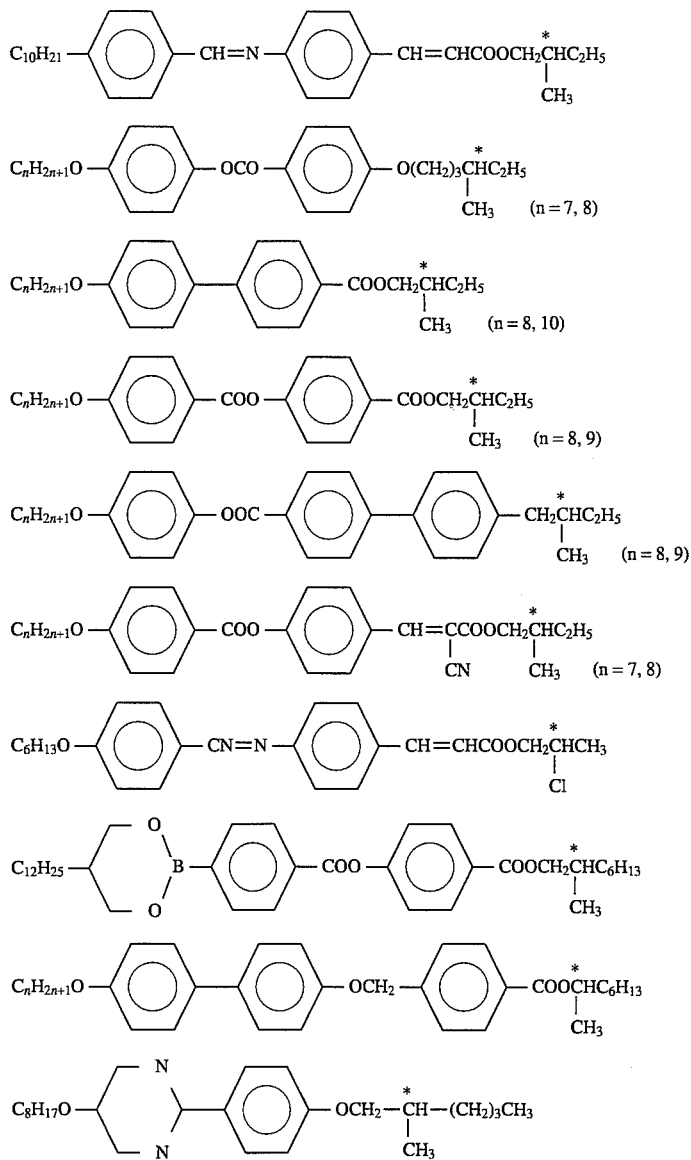

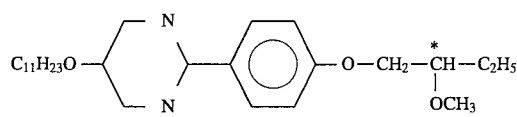

cholesterol derivatives.

As examples of the optically active compound used in the present invention there also may be mentioned optically active compounds of high-molecular weight. Any polymer having a high-molecular weight may be used provided that it contains an optically active group in the molecule, but when the miscibility with the base polymer is taken into account, it is desirable to use a high-molecular weight polymer which exhibits liquid crystallinity. Examples are the following liquid crystalline polymers having optical activity: polyacrylates, polymethacrylates, polymalonates, polysilolxanes, polyesters, polyamides, polyester amides, polycarbonates, polypeptides, and cellulose. Above all, from the standpoint of miscibility with the nematic liquid crystalline polymer serving as the base, mainly aromatic, optically active polyesters are most preferred. Examples are the following polymers:

Polymer comprising the following structural units:

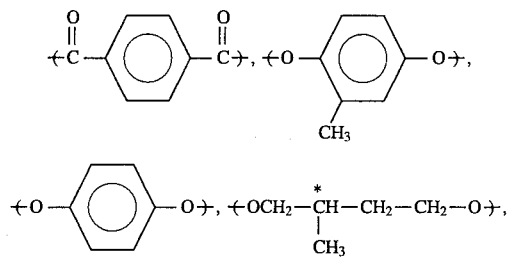

Polymer comprising the following structural units:

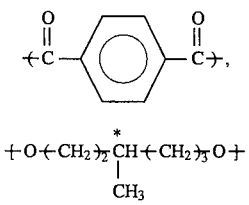

Polymer comprising the following structural units:

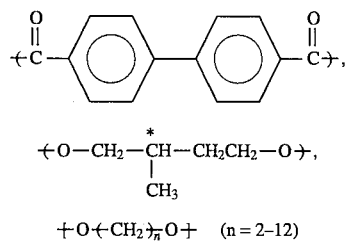

Polymer comprising the following structural units:

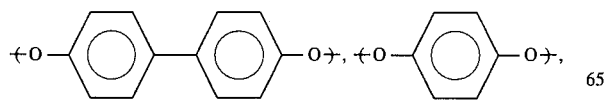

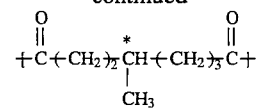

Polymer comprising the following structural units:

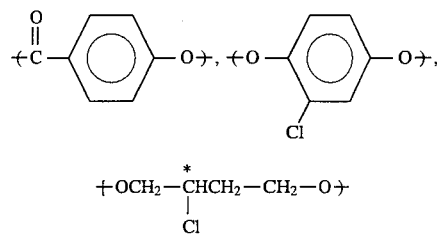

Polymer comprising the following structural units:

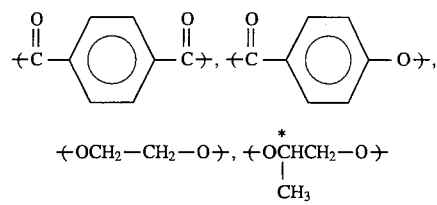

Polymer comprising the following structural units:

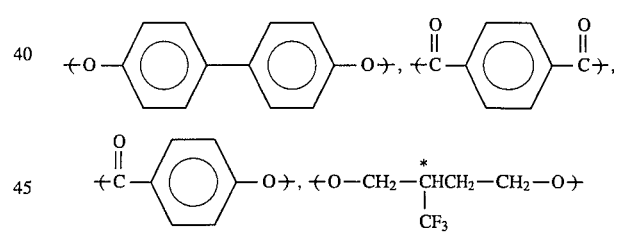

Polymer comprising the following structural units:

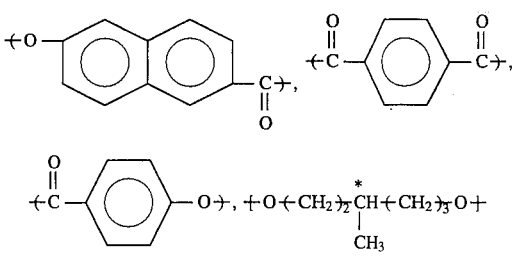

Polymer comprising the following structural units:

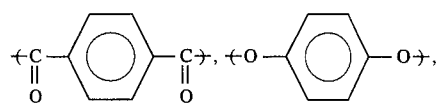

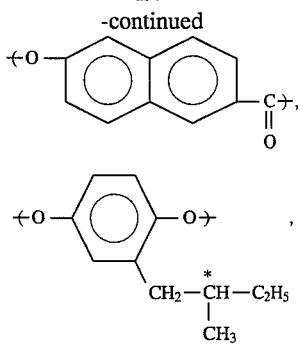

Polymer comprising the following structural units:

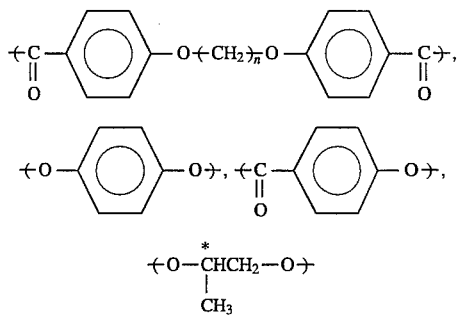

Polymer comprising the following structural units:

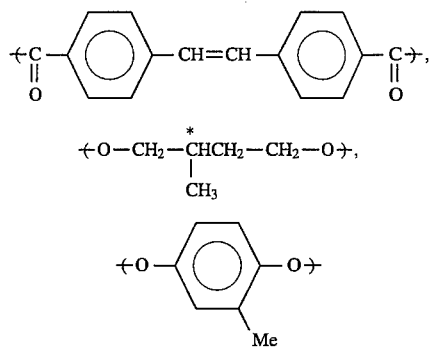

In each of these polymers, the proportion of the unit having an optically active group is usually in the range of 5 to 80 mole %, preferably 10 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

In the present invention, the liquid crystalline polymer which exhibits a twisted nematic orientation in the state of liquid crystal and assumes a glassy state at a temperature below the liquid crystal transition point of the polymer, can be prepared by mixing a nematic liquid crystalline polymer and an optically active compound at a predetermined ratio by a solid mixing, solution mixing or melt-mixing method. The proportion of the optically active component in the composition is in the range of preferably 5 to 70 wt. %, more preferably 10 to 60 wt. %, although it differs depending on the proportion of optically active groups contained in the optically active compound or the twisting power of the optically active compound for imparting twist to the nematic liquid crystal. If the proportion of the optically active compound is less than 5 wt. %, it will be impossible to impart a sufficient spiral structure to the nematic liquid crystal, the intra-plane index will not become sufficiently uniform after orientation and solidification or a transmitted light will be colored due to the selective reflection of visible light thereby it will not function as a compensator. And a proportion thereof greater than 70 wt. % will exert a bad influence on the orientation.

In the preparation of the compensator of the present invention, as mentioned below, a high molecular liquid crystal which provides a uniform, cholesteric orientation of monodomain for itself without using any other optically active compound and which permits the state of such orientation to be immobilized easily can be used. It is essential that the polymer in question have an optically active group in the molecule and be optically active. Examples are main chain type liquid crystalline polymers such as polyesters, polyamides, polycarbonates and polyester imides, as well as side chain type liquid crystalline polymers such as polyacrylates, polymethacrylates and polysiloxanes. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic or polycyclic hydrocarbon units having halogen or halogen-containing substituent groups as mentioned above. These optically active polyesters can be obtained by introducing in the nematic liquid crystalline polyesters so far explained such optically active groups as shown below using diols, dicarboxylic acids and hydroxycarboxylic acids (the * mark in the following formulae represents an optically active carbon):

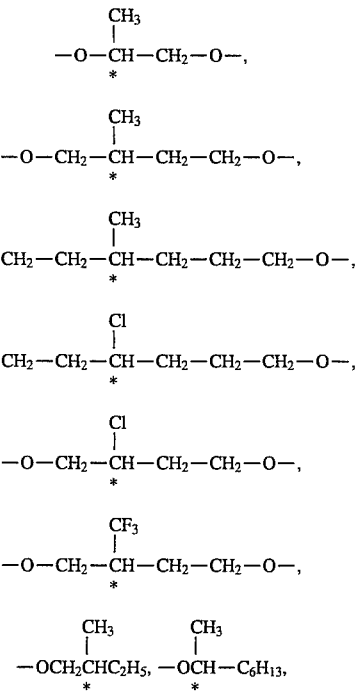

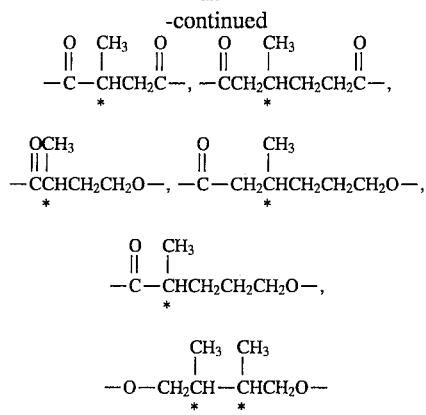

The proportion of these optically active groups in the polymers is in the range of 2 to 50 mole %, more preferably 5 to 40 mole %. If the foregoing proportion is less than 2 mole %, the intra-plane index will not become sufficiently uniform after orientation and solidification, thus a compensator will not be formed. Additionally, if the foregoing proportions are greater than 50 wt.% an adverse effect on the orientation of the polymers will result. The molecular weights of these polymers are in the range of 0.05 to 3.0, more preferably 0.07 to 2.0, in terms of intrinsic viscosity as determined at 30° C. in, for example, a mixed phenol/tetrachloroethane (60/40) solvent. A smaller intrinsic viscosity of less than 0.05 is not desirable because the strength of the resulting high molecular liquid crystal will be low, while if the intrinsic viscosity is larger than 3.0, there will arise problems such as the deterioration of orientability and an increase of the time required for orientation because of too high a viscosity during the formation of liquid crystal. Also important are the glass transition points of these polyesters, which exert influence on the stability of orientation after the immobilization of orientation. The glass transition temperature is usually not lower than 0° C., preferably not lower than 10° C. Assuming that the working temperature is room temperature or thereabouts, it is desirable that the glass transition point be not lower than 30° C., more preferably not lower than 50° C., though this differs depending on the use. If the glass transition point is lower than 0° C., the use of the compensator at room temperature or thereabouts may cause a change of the liquid crystal structure which has once been immobilized, thus resulting in the deterioration of a function based on the liquid crystal structure.

These polymers can be prepared by the foregoing melt polycondensation process or acid chloride process.

The following are typical examples of the liquid crystalline polymer used in the present invention described above.

Polymers represented by:

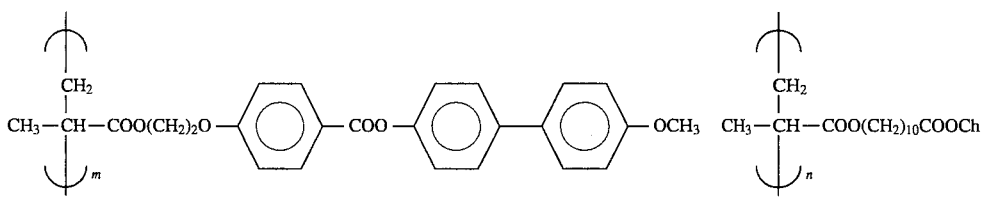

Ch: cholesteryl m/n= usually 95/5 to 20/80, preferably 90/10 to 30/70, more preferably 90/15 to 40/60

Polymers represented by:

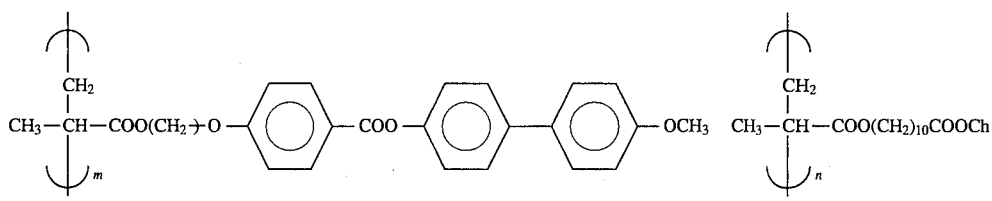

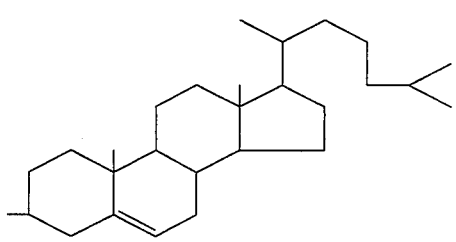
m/n= usually 95/5 to 20/80, preferably 90/10 to 30/70, more preferably 85/15 to 40/60
Polymers represented by:
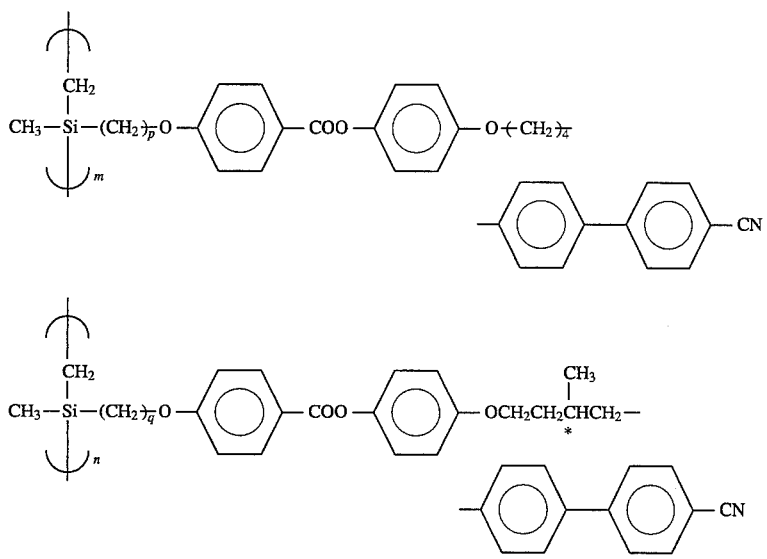
m/n= usually 95/5 to 20/80, preferably 90/10 to 30/70, more preferably 90/20 to 40/60
p, q: integer of 2 to 20
Polymers represented by:
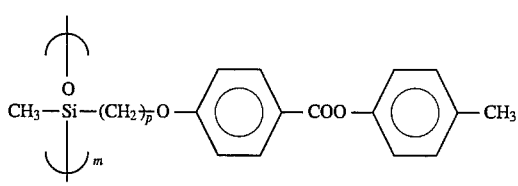
m/n= usually 95/5 to 20/80, preferably 90/10 to 30/70, more preferably 85/15 to 40/60
p, q: integer of 2 to 20
Polymers represented by:
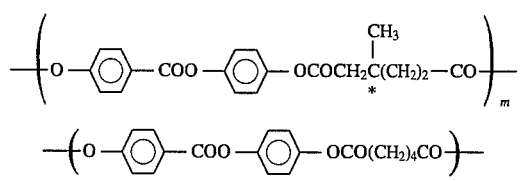
m/n= 5/95 to 70/30, preferably 10/90 to 60/40, more preferably 15/80 to 50/50
Polymers represented by:
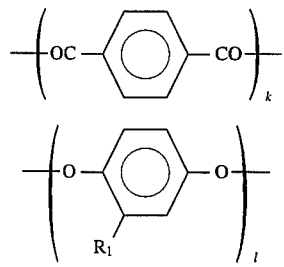

-continued

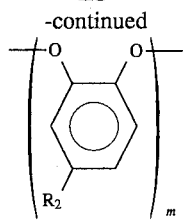

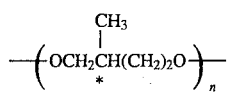

k=l+m+n k/n= 95/5 to 60/40, preferably 90/10 to 70/30 l/m= 5/95 to 95/5, $R_1$ and $R_2$ are independently H, Cl or straight or branched alkyl of 1 to 6 carbon atoms Polymers represented by:

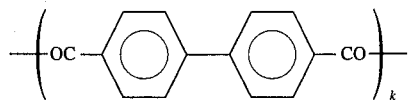

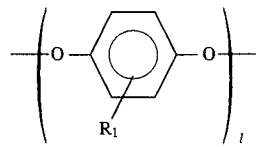

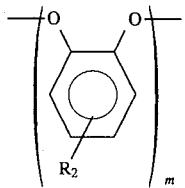

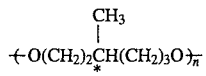

k=l+m+n k/n= 95/5 to 60/40, preferably 90/10 to 70/30 l/m= 5/95 to 95/5, $R_1$ and $R_2$ are independently H, Cl or straight or branched alkyl of 1 to 6 carbon atoms Polymers-mixtures represented by:

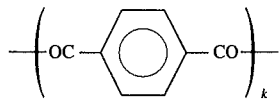 (A)

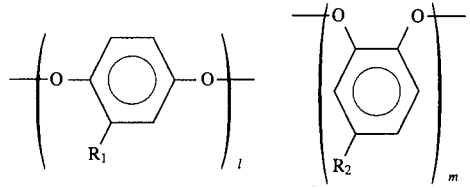

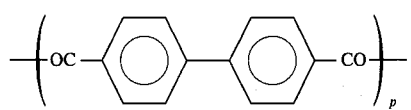 (B)

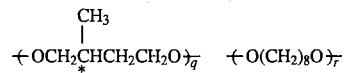

(A)/(B)= usually 95/5 to 30/70 (weight ratio), preferably 90/10 to 40/60, more preferably 85/15 to 50/50 k= l+m l/m= 90/10 to 10/90 p=q+r r/q= 0/100 to 80/20, $R_1$ and $R_2$ are independently H, Cl or straight or branched alkyl of 1 to 6 carbon atoms Polymer mixtures represented by:

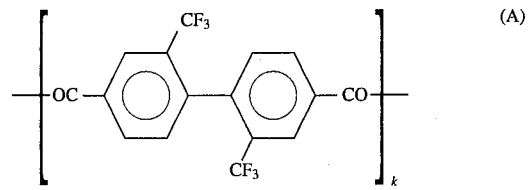 (A)

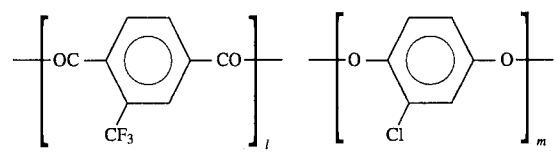

(B) cholesteryl benzoate (A)/(B)= usually 95/5 to 40/60 (weight ratio), preferably 90/10 to 50/50, more preferably 85/15 to 55/25 m=k+l k/l= 80/20 to 20/80

Polymer mixtures represented by:

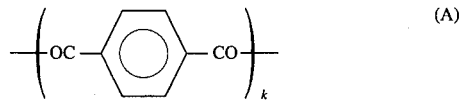 (A)

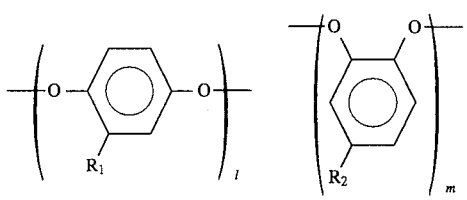

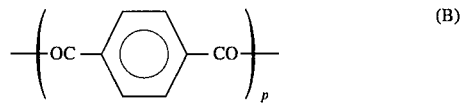 (B)

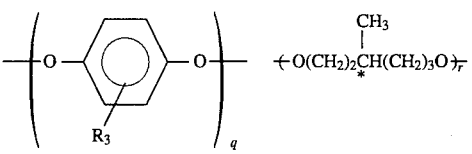

(A)/(B)= usually 95/5 to 30/70 (weight ratio), preferably 90/10 to 40/60, more preferably 85/15 to 50/50 k=l+m l/m= 15/85 to 50/50 p=q+r p/r= 20/80 to 80/20, $R_1$, $R_2$ and $R_3$ are independently H, Cl or straight or branched alkyl of 1 to 6 carbon atoms Polymer mixtures represented by:

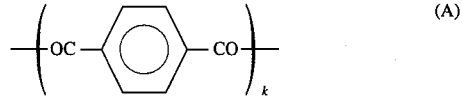 (A)

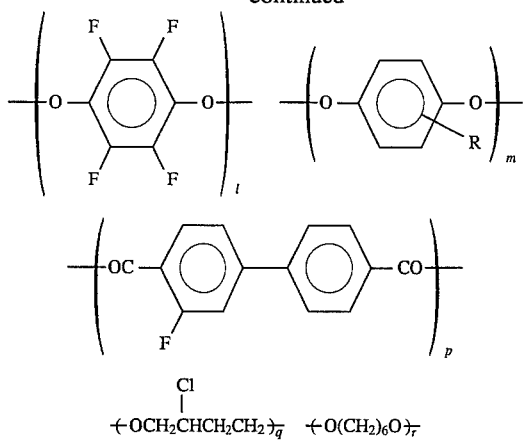

(A)/(B)= usually 95/5~50/50 (weight ratio), preferably 90/10~60/40, k= l+ m l/m= 70/30~30/70, p= q+ r, r/q= 0/100~80/20, more preferably 10/100~60/40, R is straight or branched alkyl of 3 to 6 carbon atoms Polymer, mixtures represented by:

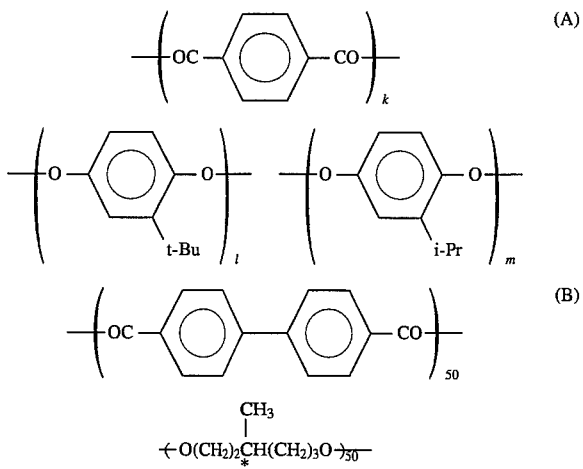

(A)/(B)= usually 96/4~40/60 (weight ratio), preferably 90/10~50/50, more preferably 85/15~55/45, k= l+ m, l/m= 85/15~25/75

Polymer and optically active compound mixtures represented by:

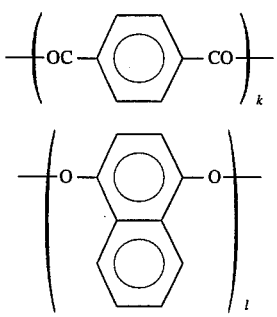

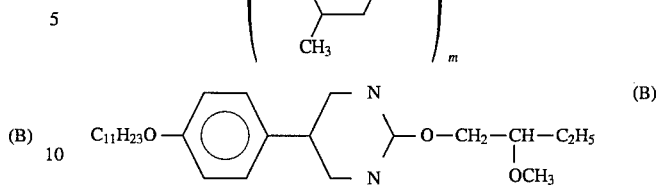

(A)/(B)= usually 96/5~60/40 (weight ratio), preferably 90/10~70/30, k=l+ m, l/m= 85/15~30/70

The mark * represents an optically active carbon.

These polymers range in molecular weight preferably from 0.05 to 3.0, more preferably 0.07 to 2.0, in terms of inherent viscosity as determined at 30° C. in a solvent, e.g. tetrahydrofuran, acetone, cyclohexanone, or mixed phenol/tetrachloroethane (60/40) solvent. If the inherent viscosity is smaller than 0.05, the strength of the resulting liquid crystalline polymer will be low, and a larger value than 3.0 will result in too high viscosity during the formation of liquid crystal, thus causing deteriorated orientability and increase in the time required for orientation.

A typical embodiment of the compensating layer prepared in the present invention is that formed on an oriented film formed on a light transmitting substrate. As examples of the light transmitting substrate used there are mentioned light transmitting plastic film, plastic sheet and polarizing film. As glass there is used, for example, soda glass, silica-coated soda glass, or borosilicate glass. As to a plastic substrate, it is preferable for it being optically isotropic. For example, there may be used, polymethyl methacrylate, polystyrene, polycarbonate, polyether sulfone, polyphenylene sulfide, amorphous polyolefin, triacetyl cellulose, or epoxy resin. Above all, polymethyl methacrylate, polycarbonate, polyether sulfone, amorphous polyolefin and triacetyl cellulose are preferred.

As examples of the alignment film, a rubbing-treated polyimide is preferably used but conventional alignment films such as silicon oxide-oblique vapor deposited film, rubbing-treated polyvinyl and alcohol film may also be used. Depending on films, an orientating property may be provided by rubbing in one direction directly with cloth or the like without coating polyimide or the like.

The viewing angle compensator is prepared by forming a polymer liquid crystal film exhibiting compensating properties on the alignment film formed on the light transmitting substrate. When a composition comprising a nematic liquid crystalline polyester and an optically active compound is used as the liquid crystalline polymer, for example in the case of a solution mixing, first both components are dissolved in a solvent at predetermined proportions to prepare a solution of a predetermined concentration. In the case where an optically active polyester which exhibits a twisted nematic orientation is used in place of such liquid crystalline polymer composition, the optically active polyester alone is dissolved in a predetermined solvent at a apredetermined concentration to prepare a solution. In this case, the solvent to be used differs depending on the kind of the polymer used, but usually there may be used, for example, any of ketones such as acetone, methyl ethyl ketone and cyclohexanone, ethers such as tetrahydrofuran and dioxane, halogenated hydrocarbons such as chloroform, dichloroethane, tetrachloroethane, trichloroethylene, tetrachloroethylene and o-dichlorobenzene, mixed solvents thereof with phenol, as well as dimethylformamide, dimethylacetamide, dimethyl sulfoxide and N-methylpyrrolidone. The concentration of the solution differs greatly depending on the viscosity of the polymer used, but usually it is in the range of 5 to 50 wt. %, preferably 10 to 35 wt. %. The solution is then applied on the orientation-treated light transmitting glass plate, plastic plate or plastic film. The method of orientation treatment is not specially limited provided that liquid crystalline molecules can be oriented parallel to the interface. For example, a polyimide-rubbing treated glass or film which as obtained by coating polyimide on a substrate followed by rubbing-treatment is preferably used. .As coating methods, there are mentioned spin coating method, roll coating method, printing method, curtain coating method, or dipping/pulling up method. After the application of the solution, the solvent is removed by drying, followed by heat treatment at a predetermined temperature for a predetermined time to complete a cholesteric orientation of monodomain. For assisting the orientation based on the interfacial effect, the lower the polymer viscosity, the better, and hence the higher the temperature, the more preferable, and a too low temperature is not desirable becauseit will cause an increase of cost and deterioration of the working efficiency. A certain polymer has, however an isotropic phase in a higher temperature region than the liquid crystalline phase, so even if heat treatment is made in this temperature region, there will not be obtained orientation. Thus, it is desirable that in accordance with the characteristics of the polymer there be performed heat treatment at a temperature not lower than the glass transition point thereof and below the transition point to an isotropic phase. Usually, the range of 50° to 300° C. is preferable and the range of 100° to 250° C. is more preferable. The time required for obtaining a satisfactory orientation in the state of liquid crystal on the alignment film differs depending on the composition and molecular weight of the polymer used, but preferably it is in the range of 30 seconds to 100 minutes, more preferably 60 seconds to 60 minutes. If the said time is shorter than 30 seconds, the orientation obtained will be unsatisfactory, and if it is longer than 100 minutes, the transparency of the resulting compensator may be deteriorated. The same state of orientation can also be obtained by applying the polymer in a melted state onto the substrate which has been subjected to the orientation treatment, followed by heat treatment. By performing these treatments there can be obtained a uniform, cholesteric orientation throughout the whole surface of the alignment film in the state of liquid crystal.

By subsequent cooling to a temperature below the glass transition point of the liquid crystalline polymer, the orientated state thus obtained can be solidified without destroying the cholesteric orientation. Generally, in the case of using a polymer having a crystal phase in a lower temperature region than the liquid crystal phase, the orientation in the state of liquid crystal will be destroyed by cooling. In the method of the present invention, such phenomenon does not occur because there is used a polymer having glass phase under the liquid crystal phase, and it is possible to solidify the cholesteric orientation completely.

The cooling rate is not specially limited. Such orientation is solidified by mere transfer from within the heating atmosphere into an atmosphere held at a temperature below the glass transition point of the liquid crystalline polymer. For enhancing the production efficiency there may be performed a forced cooling such as air cooling or water cooling.

The present invention is characteristic in that the control of orientation can be made to a high degree and the oriented stated can be solidified while only one side of film is contacted with an alignment film and the other side thereof is kept free, for example, in a contacted state with air phase. Generally, the orientation of liquid crystal is controlled in a contacted state of both faces thereof with an alignment film, and if one face is in contact with air phase, the molecular orientation in the interface with the air is not uniform, so there will not be obtained a uniform orientation in the whole area in the film thickness direction. According to the present invention, a cholesteric orientation of monodomain can be attained by control of only one side, and the orientation thus obtained can be solidified. This is a great feature of the present invention.

In order for the viewing angle compensator produced according to the present invention to exhibit a satisfactory viewing angle compensating effect, it is necessary to make matching liquid crystal display cells with respect to the thickness of the liquid crystalline polymer film (compensating layer). An appropriate film thickness cannot be broadly described because it depends on optical parameters of the liquid crystal display to be compensated as well as an intra-plane refractive index of the viewing angle compensator and a refractive index thereof in the thickness direction, but usually it is in the range of 0.1 to 50 μm, preferably, 0.4 to 40 μm. If the film thickness is smaller than 0.1 μm, a satisfactory viewing angle compensating effect will not be obtained, and if it is larger than 50 μm, it becomes impossible to improve the viewing angle characteristic inherent in the liquid crystal display, which characteristic may be deteriorated. The film thickness can be controlled easily by adjusting the concentration of a polymer solution to be applied, conditions of a coating apparatus to be used, etc.

The product calculated by multiplying a birefringence ($\Delta n$) of the compensating layer by a pitch length (p) of a liquid crystalline polymer which constitutes the compensating layer is usually less than 600 nm, preferably less than 500 nm, more preferably 0.01 μm<$\Delta np$<0.4 μm, further more preferably 0.02 μm<$\Delta np$<0.3 μm, most preferably 0.03 μm<$\Delta np$<0.25 μm, where $\Delta n$ is the difference of the refractive indices between the direction parallel to the director of liquid crystalline polymer and the direction perpendicular to the director of liquid crystalline poller, and p is the cholesteric pitch. Also, when a selective reflection appears in the compensating layer, the central wave-length of selection reflection λ is usually λ>0.68 μm or λ<0.42 μm, preferably λ>0.69 μm or λ<0.41 μm, more preferably λ>0.70 μm or λ<0.40 μm.

The viewing angle compensator thus obtained may be used as it is, or a protective layer of a transparent plastic material may be formed on the surface of the compensator for the protection of the surface. Or it may be used integrally with another optical element such as a polarizing plate for example. The liquid crystalline polymer film thus formed exhibits a viewing angle compensating effect for a liquid crystal display of the type wherein the state with liquid crystal molecules being oriented substantially perpendicularly to the substrate is assumed to be a dark display. For example, it is possible to improve the viewing angle characteristic of TN or STN display of a normally white mode or an ECB type display. The position where the viewing angle compensator is to be mounted is not specially limited if only it is between upper and lower polarizing plates. It is optional whether the viewing angle compensator is to be used as a single compensator or in combination of two or more. Since compensator obtained according to the present invention can be regarded as having almost little intra-plane refractive anisotropy, it is not necessary to make axial alignment or the like at the time of mounting the compensator into a liquid crystal display; the compensator may be mounted in any direction. It is also possible, however, to restrict a viewing direction of the compensated display by utilizing pre-tilt and/or silghtly residual infra-plane optical avisotropy of the compensating layer.

The viewing angle compensator thus obtained may be used together with a color compensating element which is for improving the contrast of a liquid crystal display, or it may be used in a display having a color filter for color display.

As set forth above, since the viewing angle compensator producing method of the present invention permits solidifying of a uniform cholesteric structure of monodomain throughout the whole of the compensating layer, the resulting viewing angle compensator can greatly contribute to remedying the viewing angle dependency of a liquid crystal display. Besides, since the method of the invention is a simple method, the manufacturing cost can be kept low and thus this method is of an extremely great industrial value.

EXAMPLES

The following examples are given to further illustrate the present invention, but it is to be understood that the invention is not limited thereto. The following analyzing methods were used in those examples.

(1) Determination of Polymer Composition

Polymer was dissolved in deuterated chloroform or deuterated trifluoroacetic acid and the polymer composition was determined using $^1$H-NMR of 400 MHz (JNM-GX400, a product of Japan Electron Optics Laboratory Co., Ltd.).

(2) Determination of Inherent Viscosity

Determined in a mixed Phenol/tetrachloroethane solvent (60/40 weight ratio) at 30° C. using a Ubbelohde's viscometer.

(3) Determination of Liquid Crystal Phase Series

Determined by measurement using DSC (DuPont 990 Thermal Analyzer) and observation using an optical microscope (BH2 Polarizing Microscope, a product of Olympus Optical Co., Ltd.).

(4) Measuring Refractive Index Distribution of Liquid Crystalline Polymer Film after Solidifying of Orientation Refractive indices in the three-dimensional direction were measured using Abbe's refractometer (Type 4T, a product of Atago K.K.) and an orientation structure was determined by observation using a conoscope attached to a polarizing microscope. Specifically, a refractive index in the intra-plane direction (N) and a refractive index in the thickness direction (n0) were determined by using the refractometer. Where the refractive index in the director direction of the liquid crystalline polymer is ne and a refractive index in the direction perpendicular to the director is no, the intra-plane refractive index is given by the following equation (W. H. de Jeu, in "Physical Properties of Liquid Crystalline Materials", Gordon and Breach, New York 1980).

$$N = \sqrt{\frac{no^2 + ne^2}{2}}$$

From the results of the refractive indices determination, $\Delta n = ne - no$ was obtained.

(5) Determination of Pitch (P)

The central wave length of selection reflection ($\lambda$) was determined by using a UV/UIS/NIR Spectrophotometer (JASCO V-570).

Pitch P was obtained from $\lambda = P \times N$.

In the case where the selection reflection wave length was in a wave length region which is difficult to measure, it was obtained from a working curve prepared in advance which indicates the relationship between the amount of chiral unit or chiral polymer in the liquid crystalline polymer and selection reflection wave length.

EXAMPLE 1

Using 100 mmol of terephthalic acid, 50 mmol of methylhydroquinone diacetate, 50 mmol of catechol diacetate and 100 mg of sodium acetate, polymerization was conducted in a nitrogen atmosphere while the temperature was raised stepwise like 150° C. 1 hour, 200° C. 1 hour and 250° C. 1 hour. Then, the polymerization was continued at 250° C. for 2 hours under the flow of nitrogen gas. Further, the polymerization was allowed to proceed for 1 hour at the same temperature under a reduced pressure. The resulting polymer was dissolved in tetrachloroethane and thereafter reprecipitation was made using methanol to afford 15.0 g of a purified polymer of formula (1). The polymer had an inherent viscosity of 0.14, a nematic phase only as a liquid crystal phase and a glass transition point of 96° C.

This polyester was mixed with an optically active polyester of formula (2) at a weight ratio of 60:40 and the resulting mixture was dissolved in tetrachloroethane to prepare a coating solution having a total polymer concentration of 15 wt %.

The polymer solution was applied onto a 1.1 mm thick glass base having a rubbing-treated polyimide layer and having a size of 10 cm×10 cm by a screen printing method, then dried, heat-treated at 220° C. for 30 minutes and then cooled to obtain a transparent, colorless compensating layer having a thickness of 5.5 μm. Upon conoscope observation of this compensating layer using a polarizing microscope, clear isogyre was observed centrally of the visual field. Further, when a sharp color detector was inserted, there was observed an increase and then a decrease of retardation peculiar to a negative crystal. It turned out that this crystal was regarded as being a negative uniaxial crystal with an optical axis facing in the thickness direction.

The above polymer composition was oriented in the same manner as above onto a high refraction glass plate (a product of Hoya Glass Works, Ltd., refractive index: 1.84) having a rubbing-treated polyimide film formed thereof and then refractive indices were measured, which were found to be the same in all of directions parallel to the substrate and 1.53 in the thickness direction.

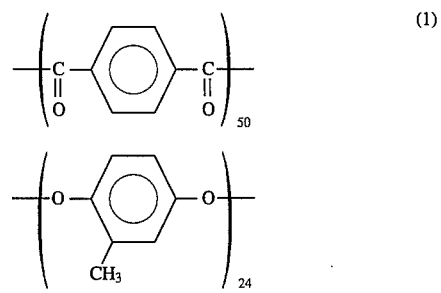

-continued

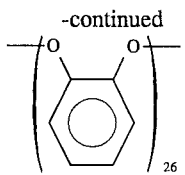

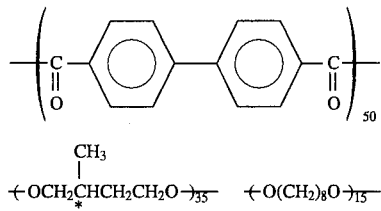
(2)

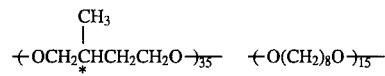

The compensator thus formed had the following parameters:

N= 1.65, n0=1.53 and λ=0.35 μm, thus, ne= 1.77, Δn= 0.24, p= 0.21 μm and Δnp= 0.051 μm.

EXAMPLE 2

Figure 2B:
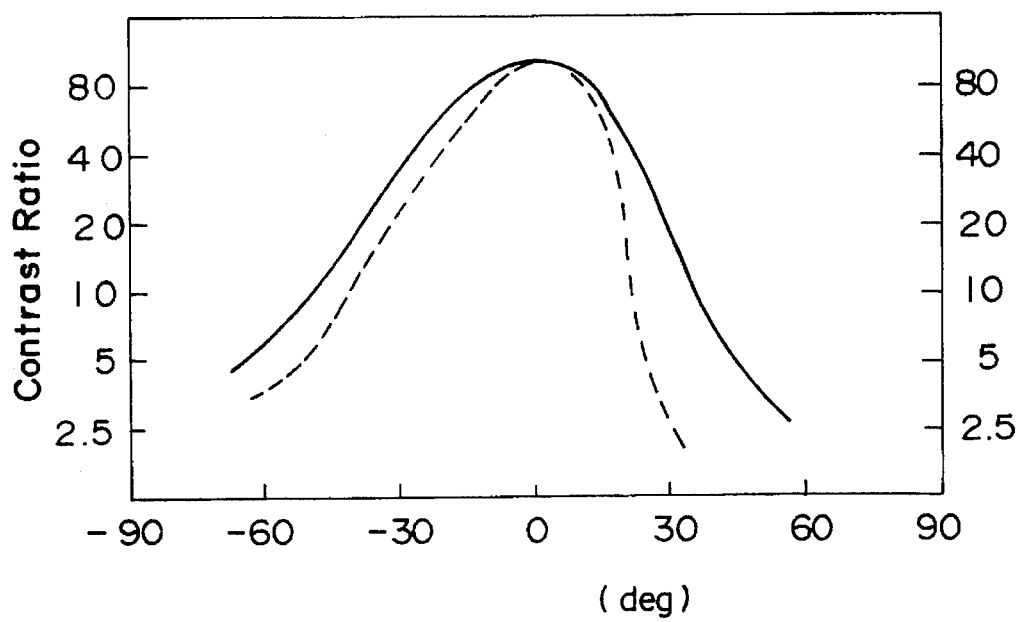
FIGS. 2(a) and 2(b) are diagrams showing the results obtained in Example 2, representing a viewing angle-contrast relation obtained when the TN test display is seen from above, below and right, left.
Figure 2A:
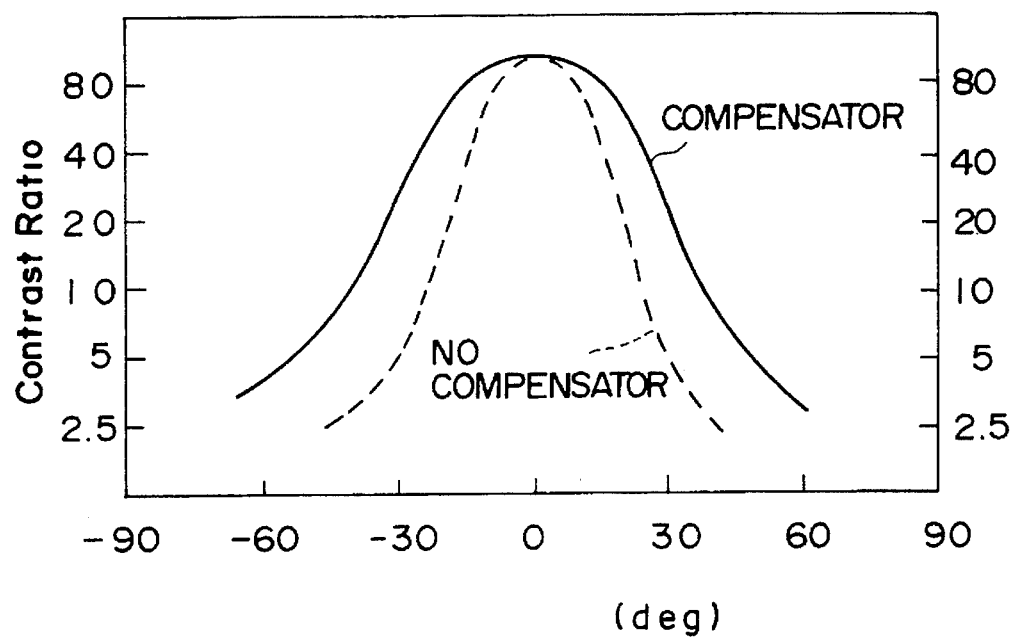

A TN test cell (90° left-hand twist, retardation: 1.06 μm) and the viewing angle compensator fabricated in Example 1 were arranged as illustrated in FIGS. 1(a)–1(e) and the viewing angle dependency of contrast was measured. There was obtained such results as shown in FIGS. 2(a) and 2(b) and thus a viewing angle compensating effect of the compensator was confirmed.

EXAMPLE 3

The polymers of formulae (1) and (2) used in Example 1 were mixed together at weight ratios of 80:20 and 70:30 and the resulting mixtures were each oriented and solidified onto a glass plate having a rubbing-treated polyimide film. In the use of the 80:20 composition, a selective reflected light of red color was observed, while in the use of the 70:30 composition, a selective reflected light of bluish purple was observed.

Figure 3:
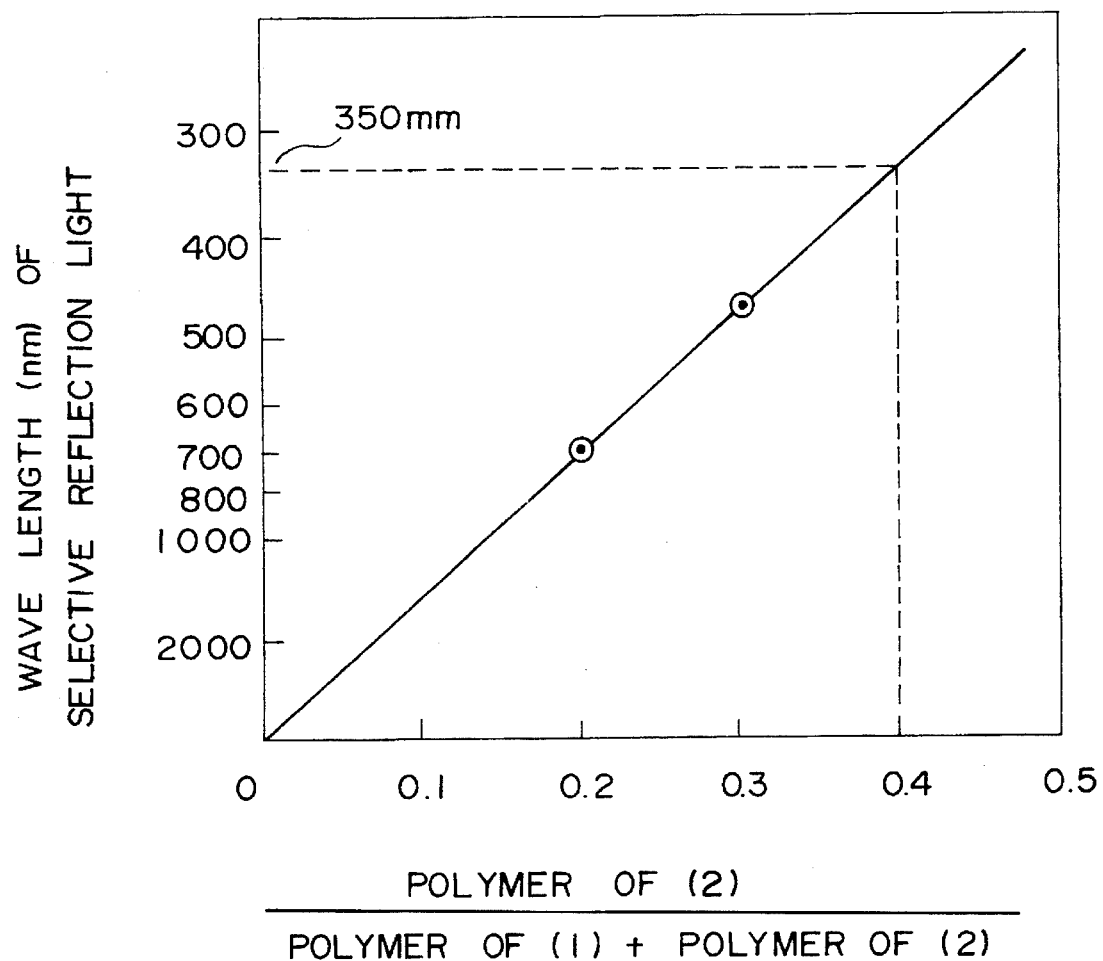
FIG. 3 is a diagram showing a relation between the wavelength of a selective reflected light of the sample obtained in Example 3 and the composition of polymer, in which the axis of ordinate represents the selective reflection wavelength and the axis of abscissa represents the ratio of formula (2) polymer/formula (1) polymer+ formula (2) polymer, the axis of ordinate being graduated so that the reciprocal of wavelength is proportional.
Figure 4E:
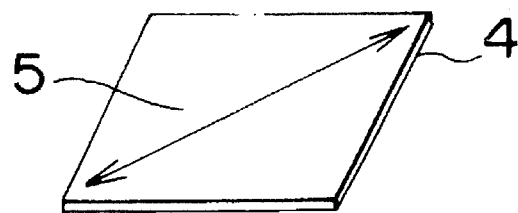
FIGS. 4(a)–4(e) are views showing the construction of the TN display and the viewing angle compensator both used in Example 5, also showing the direction of each axis.
Figure 4D:
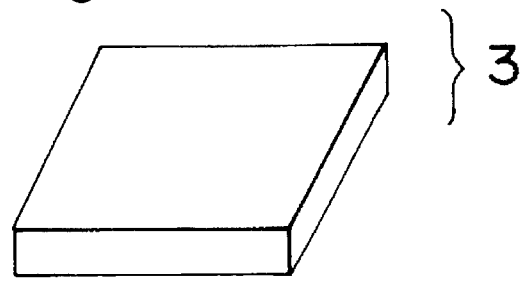
Figure 4C:
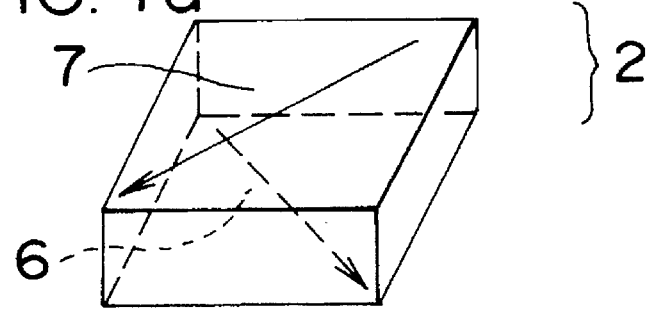
Figure 4B:
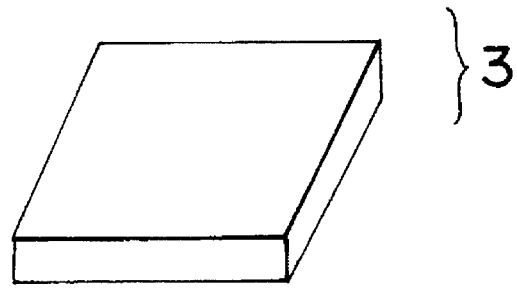
Figure 4A:
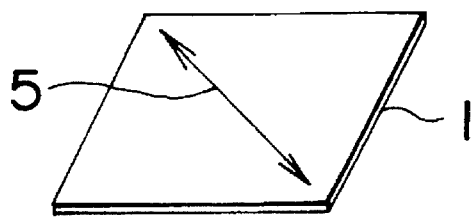

The films thus formed were measured for transmission spectrum, and selective reflection wavelengths were determined from minimum values of transmittance to obtaine the graph of FIG. 3. From this graph, the wavelength of selective reflected light of the viewing angle compensator [comprising the polymers of formulae (1) and (2), 60:40] fabricated in Example 1, namely the product of pitch and refractive index, was estimated at 350 nm.

The compensator thus formed has the following parameters:

N= 1.65, n0= 1.53 and λ=0.35 μm, thus, ne= 1.77, Δn= 0.24, p= 0.21 μm and Δnp= 0.051 μm.

EXAMPLE 4

There was prepared a 20 wt. % solution of an optically active polymer (inherent viscosity 0.14, Tg= 75° C.) of formula (3) in N-methylpyrrolidone. This solution was applied by spin coating onto a 1.1 mm thick glass base having a rubbing-treated polyimide film and having a size of 10 cm×10 cm, then dried, heat-treated in an oven at 190° C. for 30 minutes and then cooled slowly down to 150° C. at a rate of 5° C./min. Thereafter, the thus-coated glass plate was taken out from the oven and air-cooled. The resulting compensating layer, having a thickness of 8 μm, was transparent and colorless. Upon conoscope observation of this compensating layer using a polarizing microscope, clear isogyre was observed centrally of the visual field. Further, when a sharp color detector was inserted, there were observed increase and decrease of retardation peculiar to a negative crystal. It turned out that this crystal was regarded as being a negative uniaxial crystal with an optical axis facing in the thickness direction.

In the same construction as in FIG. 1, a viewing angle compensating effect of this compensator on the test cell used in Example 2 was checked. Like the results obtained in Example 2, it turned out that the deterioration of contrast based on viewing angle was low in comparison with that observed in the absence of the compensator.

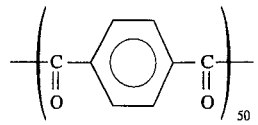
(3)

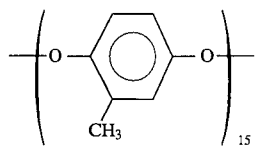

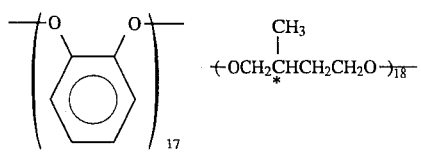

The compensator thus formed has the following parameters:

N= 1.62, n0= 1.54 and λ= 0.75 μm, thus, ne= 1.70, Δn= 0.16, p= 0.46 μm and Δnp= 0.074 μm.

EXAMPLE 5

There was prepared a 15 wt. % solution of a composition of formula (4) (inherent viscosity of base polymer 0.15, Tg=70° C.) in tetrachloroethane. The solution was then applied onto a 50 cm wide, 100 μm thick polyether sulfone film having a rubbing-treated polyimide film over a length of 5 m using a roll coater. After drying, the thus-coated film was heat-treated at 150° C. for 10 minutes and then cooled to solidify. As a result, there was obtained a transparent, colorless, filmy, viewing angle compensator having a compensating layer thickness of 4.0 μm. Upon conoscope observation of this compensator using a polarizing microscope, clear isogyre was observed centrally of the visual field. Further, when a sharp color detector was inserted, there were observed increase and decrease of retardation peculiar to a negative crystal. It turned out that this crystal was regarded as being a negative uniaxial crystal with an optical axis facing in the thickness direction.

Two sheets each having a size of 10 cm×10 cm were cut out from the resulting elongated film. Then, using them and in the construction of FIGS. 4(a)–4(e), a viewing angle compensating effect on a TN test cell (90° left-hand twist, retardation 0.48 μm) was checked. As a result, it turned out that the deterioration of contrast based on viewing angle was low in comparison with that observed in the absence of the compensator.

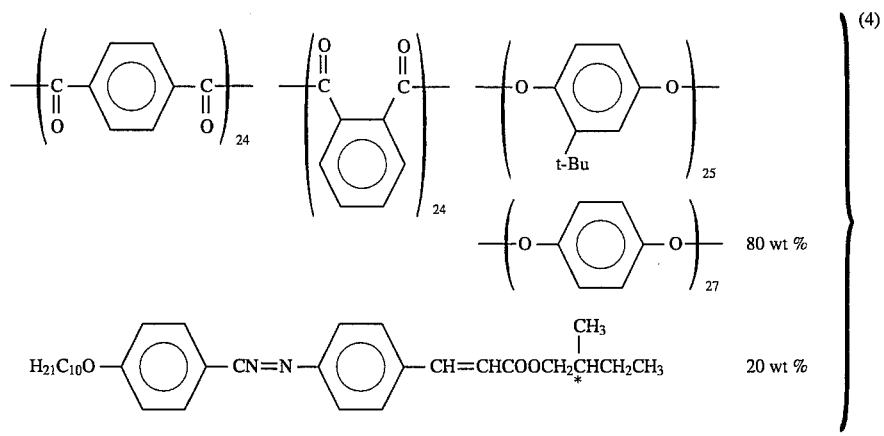

The compensator thus formed has the following parameters:

$N= 1.67$, $n_0= 1.54$ and $\lambda=0.90$ μm, thus, $n_e= 1.79$, $\Delta n = 0.25$, $p= 0.54$ μm and $\Delta np=0.13$ μm.

EXAMPLE 6

There was prepared a 16 wt. % solution of a mixed polymer of formula (5) (inherent viscosity of base polymer 0.20) in trichloroethane. The polymer solution was then applied by a screen printing method onto a 50 μm thick polyethylene terephthalate film having a rubbing-treated polyimide film and having a size of 10 cm×10 cm, then dried, heat-treated at 180° C. for 10 minutes and thereafter cooled to obtain a transparent, colorless, viewing angle compensator having a compensator thickness of 2.5 μm. As a result of conoscope observation of this compensator using a polarizing microscope, clear isogyre was observed centrally of the visual field. Further, when a sharp color detector was inserted, there were observed increase and decrease of retardation peculiar to a negative crystal. It turned out that this crystal was regarded as being a negative uniaxial crystal with an optical axis facing in the thickness direction.

having a size of 10 cm×10 cm, then dried, heat-treated in an oven at 180° C. for 25 minutes and thereafter cooled rapidly with water to solidify a liquid crystal structure. The resulting compensating layer was 6.8 μm in thickness, and as a result of conoscope observation of the compensating layer using a polarizing microscope, clear isogyre was observed centrally of the visual field. Further, when a sharp color detector was inserted, there were observed increase and decrease of retardation peculiar to a negative crystal. It turned out that this crystal was regarded as being a negative uniaxial crystal with an optical axis facing in the thickness direction.

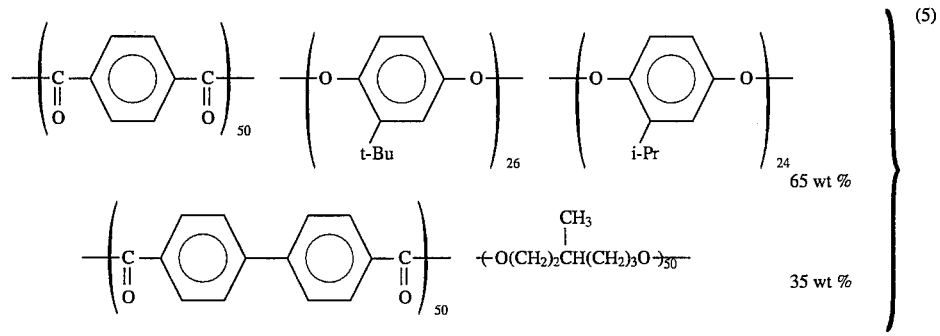

The compensator thus formed has the following parameters:

$N= 1.59$, $n_0= 1.53$ and $\lambda= 0.40$ μm, thus, $n_e= 1.65$, $\Delta n= 0.12$, $p= 0.25$ μm and $\Delta np=0.030$ μm.

EXAMPLE 7

There was prepared a 15 wt. % solution of a mixed composition of a high-molecular nematic polymer and an optically active compound of formula (6) (inherent viscosity of base polymer 0.11, $Tg=82°$ C.). The solution was then applied by a screen printing method onto a 1.1 mm thick glass base having a rubbing-treated polyimide layer and

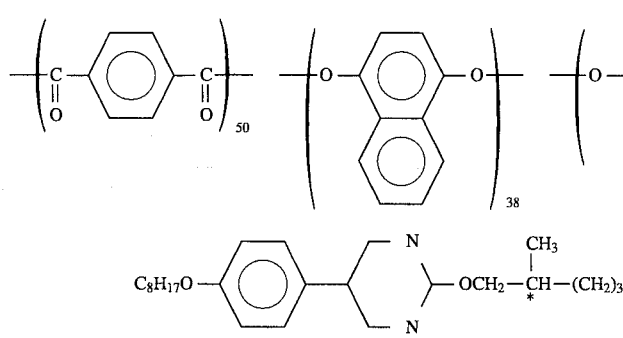
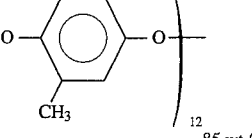
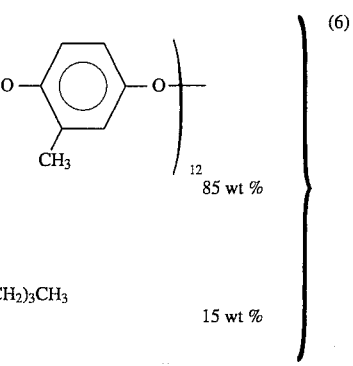

The compensator thus formed has the following parameters:

N= 1.66, n0= 1.56 and λ= 1.8 μm, thus, ne= 1.76, Δn= 0.20, p= 1.1 μm and Δnp= 0.22 μm.

(Effect of the Invention)

According to the viewing angle compensator producing method of the present invention it is possible to fabricate a viewing angle compensator which is uniform throughout the whole of its compensating layer, and thus the viewing angle compensator greatly contributes to upgrading of a liquid crystal display. Besides, since the method of the invention is a simple method, the manufacturing cost can be kept low, and thus this method is of an extremely great industrial value.

What is claimed is:

1. A method for producing a viewing angle compensator for a liquid crystal display comprising the steps of:

(i) applying a coating to a light transmitting substrate having an alignment layer thereon wherein said coating comprises (A) an optically active polyester containing as a constituent a hydrocarbon unit selected from the group consisting of (a) a radical selected from the group consisting of

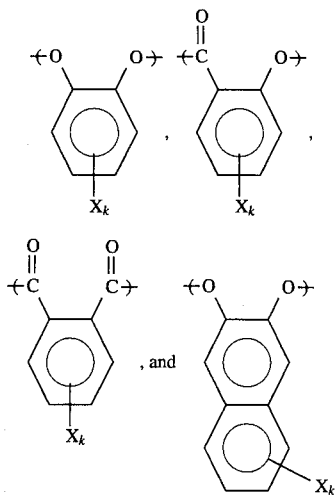

, and where X is chlorine or bromine, $C_1$–$C_4$ alkoxy, $C_1$–$C_4$ alkyl or phenyl, and k is 0 to 2; (b) polycyclic hydrocarbon units; and (c) aromatic units having a substituent selected from the group consisting of a hydrocarbon group of 3 to 8 carbon atoms, a halogen atom and mixtures thereof, with the proviso that these units exclude the units encompassed by (a); or (B) a composition containing a liquid crystalline polyester which contains said hydrocarbon unit as a constituent and an optically active compound;

(ii) heat treating the applied coating of step (i) at a temperature higher than the glass transition temperature of the polyester to form a cholesteric structure; and (iii) cooling said heat-treated coating to a temperature lower than said glass transition temperature to solidify said cholesteric structure, thereby producing a viewing angle compensator wherein said compensator has a product (Δn·p), calculated by multiplying birefringence (Δn) by pitch length (p) of the heat-treated coating, of less than 600 nm.

2. The method according to claim 1 wherein the heat treatment temperature is higher than the glass transition temperature of the polyester and lower than a transition temperature to isotropy of the polyester.

3. The method according to claim 1 wherein the heat treatment is performed at a temperature in the range from 50° C. to 300° C. for a period of time in the range from 30 seconds to 100 minutes.

4. The method according to claim 1 wherein the viewing angle compensator has a compensating layer thickness of 0.1 to 50 μm.

5. The method according to claim 1, wherein the product (Δn·p) is less than 500 nm.

6. The method according to claim 1 wherein the viewing angle compensator has a central wavelength of selection reflection, λ, of greater than 0.68 μm or less than 0.42 μm.

* * * * *

UNITED STATES PATENT AND TRADEMARK OFFICE
CERTIFICATE OF CORRECTION

PATENT NO. : 5,491,001
DATED : February 13, 1996
INVENTOR(S) : Hitoshi Mazaki, et al.

It is certified that error appears in the above-indentified patent and that said Letters Patent is hereby corrected as shown below:

Column 3, line 37: "Structure" should read --structure--

Column 24, line 26: "55/25" should read --55/45--

Column 28, line 41: "poller" should read --polymer--

Column 34, line 19: "25" should read --45--

Signed and Sealed this

Sixth Day of August, 1996

*Attest:*

BRUCE LEHMAN

*Attesting Officer*     Commissioner of Patents and Trademarks